United States Patent [19]

Nehring

[11] 4,003,403
[45] Jan. 18, 1977

[54] STOPCOCK

[75] Inventor: John R. Nehring, Woodcliff Lake, N.J.

[73] Assignee: International Paper Company, New York, N.Y.

[22] Filed: June 10, 1974

[21] Appl. No.: 477,906

[52] U.S. Cl. .................. 137/625.41; 137/625.47; 251/309; 251/311; 251/368; 251/286

[51] Int. Cl.² ........................................ F16K 5/02

[58] Field of Search .......... 251/309, 310, 311, 312; 137/625.24, 625.47, 625.41

[56] References Cited

UNITED STATES PATENTS

| | | | |
|---|---|---|---|
| 1,060,791 | 5/1913 | Schaller | 137/625.47 |
| 1,086,982 | 2/1914 | Bahruth | 137/625.24 |
| 1,214,267 | 1/1917 | Block | 137/625.24 X |
| 1,384,645 | 7/1921 | Sullivan | 137/625.47 X |
| 2,687,872 | 8/1954 | Onosko | 251/287 |
| 2,854,027 | 9/1958 | Kaiser et al. | 137/625.41 |
| 3,142,474 | 7/1964 | Von Nelson | 251/309 |
| 3,186,437 | 6/1965 | Buono | 137/625.42 |
| 3,326,230 | 6/1967 | Frank | 137/199 |
| 3,475,002 | 10/1969 | Phillips | 251/311 X |
| 3,605,812 | 9/1971 | Richter | 137/627.5 |
| 3,678,960 | 7/1972 | Leibinsohn | 251/309 X |
| 3,788,599 | 1/1974 | Cloyd | 251/309 X |

FOREIGN PATENTS OR APPLICATIONS

| | | | |
|---|---|---|---|
| 1,105,612 | 7/1955 | France | 251/312 |
| 1,152,441 | 9/1957 | France | 251/312 |
| 533,756 | 9/1931 | Germany | 137/625.47 |

*Primary Examiner*—Arnold Rosenthal
*Attorney, Agent, or Firm*—Finnegan, Henderson, Farabow & Garrett

[57] ABSTRACT

A stopcock is disclosed which comprises a body suitable for molding, having an axial bore, axially and angularly spaced apart inlet and outlet passageways through the body and intersecting the bore, and a stem rotatably mounted within the bore, the stem having an elongated slot extending radially partially therethrough and a port angularly spaced from the intersection of the slot and the stem surface and intersecting the slot at the interior of the stem. The stem is rotatable from a position effecting fluid flow communication between the passageways to a position obturating at least one of the passageways. Vent means are provided to permit removal of all liquid from the passageways.

10 Claims, 6 Drawing Figures

STOPCOCK

BACKGROUND

This invention relates to stopcocks and, more particularly, to a two piece, multi-port, molded stopcock suitable for sufficiently inexpensive manufacture to permit disposal upon the completion of the use thereof.

In spite of the numerous and varied designs of stopcocks, including multi-port two element stopcocks, it is desirable to provide an improved stopcock, particularly one having multiple axially spaced ports, which is sufficiently easy and inexpensive to manufacture to permit disposal of the stopcock upon completion of its use. To facilitate inexpensive manufacturing, it is desirable to provide a stopcock having a minimal number of elements, namely two, both of which are easily moldable and which can be easily and rapidly assembled without the need for locking elements. It is also desirable to utilize a part, such as a valve stem, which can be used with several different bodies to form different stopcocks, thereby minimizing tooling and storing expense.

Accordingly, it is an objective of this invention to provide a new and improved multi-port stopcock formed of two elements both of which are suitable for molding and which can be assembled and interlocked rapidly and easily.

It is a further objective of this invention to provide a stopcock having an improved stem which can be used with several different stopcock body designs having multiple axially spaced ports.

BRIEF DESCRIPTION OF THE INVENTION

To achieve the foregoing objectives and in accordance with the purpose of the invention, as embodied and broadly described herein, the stopcock of this invention includes a stem comprising a first end wall, a second end wall spaced from the first end wall, a sidewall between said end walls, a handle on one of said end walls, the stem having an axially elongated slot extending radially partially through the stem, at least one port angularly spaced from the intersection of the slot and the side wall about the periphery of the stem and intersecting the slot in the interior of the stem. Preferably, the stem includes a radially projecting bead formed thereon adjacent to the second end wall.

The invention further includes a plastic molded body having a bore extending axially therethrough, inlet and outlet passageways extending transversely through the body and intersecting the bore, the passageways being axially and angularly spaced apart, the stem being mounted within the body and rotatable between a first position wherein the inlet and outlet are in fluid flow communication through the slot and the port and a second position wherein at least one of the inlet and outlet passageways is obturated.

Additional objectives and advantages of the invention will be set forth in part in the description which follows and in part will be obvious from the description, or may be learned by practice of the invention. The objectives and advantages of the invention may be realized and attained by means of the instrumentalities and combinations particularly pointed out in the appended claims.

BRIEF DESCRIPTION OF THE DRAWING

The invention consists in the novel parts, constructions, arrangements, combinations and improvements shown and described. The accompanying drawing, which is incorporated in and constitutes a part of the specification, illustrates one embodiment of the invention and, together with the description, serves to explain the principles of the invention.

In the drawing.

DETAILED DESCRIPTION OF THE INVENTION

Figure 1:
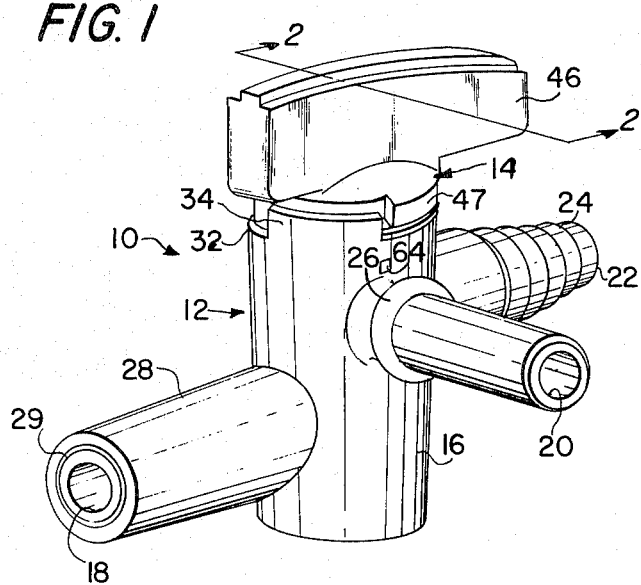
FIG. 1 is a perspective view of a three-port stopcock formed in accordance with this invention.

Terms of orientation, such as top and bottom, are used with reference to the orientation shown in the drawing for simplification of description and are not intended to serve as limitations.

Figure 3:
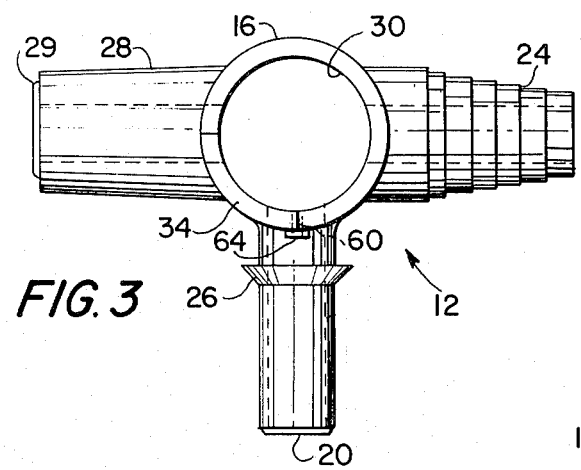
FIG. 3 is a top view of the body of the stopcock of FIG. 1.
Figure 4:
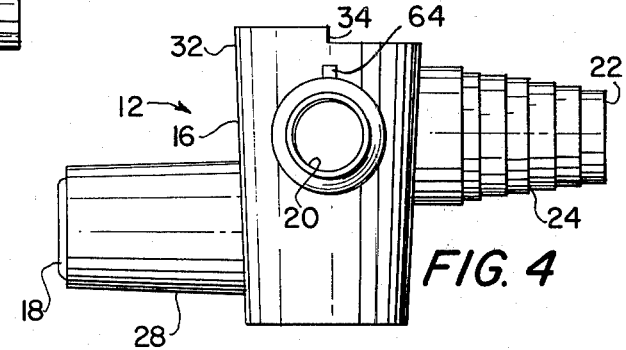
FIG. 4 is a side elevational view of the body of the stopcock of FIG. 1.
Figure 5:
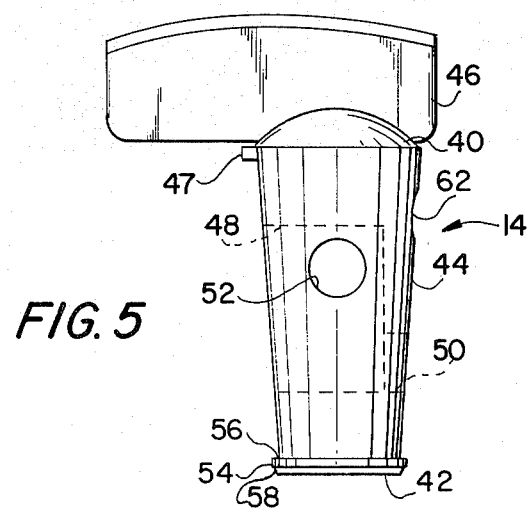
FIG. 5 is a side elevational view of the stem of the stopcock of FIG. 1.
Figure 6:
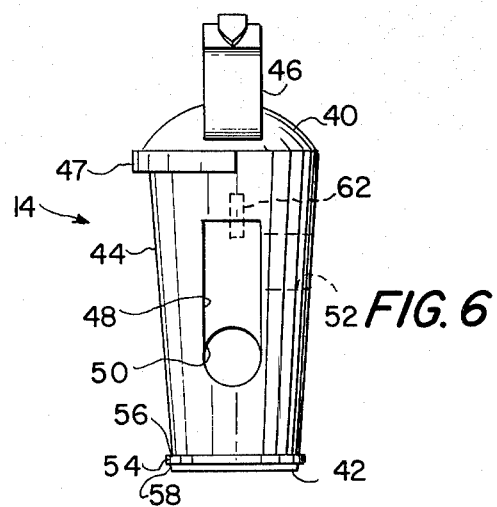
FIG. 6 is an end elevational view of the stem of the stopcock of FIG. 1.

In accordance with the invention, a stopcock is formed of two primary elements, namely a body and a stem. As here embodied, one form of stopcock 10 formed in accordance with this invention, includes a body 12 having a stem 14 rotatably mounted therein. The stopcock 10 is shown in assembled form in FIGS. 1 and 2 while the body 12 is shown in detail in FIGS. 3 and 4 and the stem 14 is shown in detail in FIGS. 5 and 6.

The body 12 is designed to permit easy molding out of plastic, such as ABS plastic. The body includes a hollow shaft 16 having a plurality of passageways, for example an inlet passageway 18 and a pair of outlet passageways 20, 22 formed as a part thereof. The passageways can be cylindrical as shown or they can be tapered toward the shaft in order to permit easy core removal after molding. In the embodiment illustrated in the drawing, the two outlet passageways 20, 22 are co-planar and are radially directed and angularly spaced apart about the circumference of the body shaft 16 by 90°. Furthermore, the inlet passageway 18 is axially spaced from the outlet passageways 20, 22 and annularly spaced therefrom, by 90° with respect to the outlet passageway 20 and by 180° with respect to the outlet passageway 22. The outlet passageway 22 is provided on its exterior surface with a gradually increasing stepped configuration 24 so that it is adapted to receive conduits of various diameters. The outlet passageway 20 is designed to receive a cylindrical cap (not shown) to cover the passageway when not in use. To prevent loss of the cap when it is removed from passageway 20, the cap is provided with a ring to slip over the outlet passageway 20. The passageway 20 is provided with a radially projecting shoulder 26 which serves as a retainer for preventing the ring from accidentally slipping off. The inlet passageway 18 is provided with a tapered smooth exterior surface 28 for receipt of a conduit and an annular bead 29 on the end thereof to form a seal with a conduit or fitting (not shown) against which it may abut. While three different exterior surfaces are shown, it is clear that any one or all the surfaces may be used in the combination shown or any other combination or arrangement or that other passageway configurations may be used. Furthermore, the orientation of the inlet and outlet passageways may be varied and the particular orientation shown is considered to be illustrative of one arrangement only. In fact, as is described below, the stem 14 of this invention is suitable for use with stopcock bodies of several different designs.

In accordance with the invention, the body shaft 16 is provided with a tapered bore 30 extending entirely throughout the axial length of the body 12. One end of the body 12, such as the larger end 32 is formed with an upstanding abutment 34 to serve as a stop mechanism for controlling operation of the stopcock 10 by limiting rotation of the stem 14. While the abutment 34 is shown as having an arcuate length of 90° (see FIG. 3), the length of the abutment may be varied depending upon the location of the passageways and the cooperating stop mechanism formed on the stem 14.

Further in accordance with the invention, the stem 14 is formed so that it may be easily molded and simply and quickly inserted into the body 12 and locked therein without the need for additional locking elements. The material of which the stem is made must be compatible with the fluid to which it is exposed and preferably is suitable for molding. One suitable material for many varied uses is low density polyethylene. As here embodied and with reference to FIGS. 5 and 6, the stem 14 is formed with a first end wall or top wall 40, a second end wall or bottom wall 42 and a side wall 44 extending therebetween. The stem is tapered from the top wall 40 toward the bottom wall 42 to facilitate easy emplacement within the stopcock body 12. Preferably, a handle 46 is formed on the top wall 40 and a flange 47 is formed adjacent to the top wall 40 and projects outwardly therefrom to serve as a stop in cooperation with the abutment 34 on the body 12. The flange 47 for the stopcock design illustrated has an arcuate length of 90°. Both the handle 46 and the flange 47 are molded as an integral part of the stem 14.

Further in accordance with this invention, an axially elongated slot 48 extending radially inwardly is molded into the stem 14. At least one port 50 also is provided through the stem 14 to intersect the slot 48. However, for a three passageway stopcock 10, a second port 52 is provided through the stem 14 and intersects the slot at the interior of the stem. The angular spacing around the periphery of the stem 14 between the ports 50, 52 and the slot 48 corresponds to the angular spacing between the body passageways 18, 20, 22. In other words, they are spaced apart by 90° increments. The axial length of the slot 48 is greater than the axial spacing between the axially spaced body passageways, such as passageways 18, 22. The slot 48 and ports 50, 52 are formed by cores of simple design which may be easily removed. In this manner the slot provides an axial passageway through the stem which is formed during the molding of the stem and does not require an additional manufacturing step.

The stem is also provided adjacent to its bottom wall 42 with a radial projection or bead 54. Preferably, the bead 54 is formed with a radially directed shoulder 56 spaced from the bottom wall 42 and a base 58 tapered from the shoulder 56 toward the bottom wall 42 to form an annular wedge like bead.

Preferably, the side wall 44 of the stem 14 is coated with a lubricant to allow it to slide and rotate easily within the body 12 and prevent binding of the stem. A silicone lubricant has been found suitable for a polyethylene stem and an ABS body.

The stopcock 10 is assembled easily and rapidly by inserting the stem 14 into the body 12, the enlarged opening at the top of the body 12, as a result of the tapered configuration of the bore 30, facilitating easy acceptance of the stem, including the enlarged bottom of the stem as a result of the bead 54. As the stem is forced downwardly into the body 12, the enlarged end of the stem ultimately forms an interference fit with the bore 30. However, because of the wedge shaped configuration of the bead 54, the materials used and the relative dimensions of the stopcock body, bore 30, and bead 54, the stem is able to be forced into the body until the bead 54 snaps into place below the stem body thereby locking the stem in place. The stem 14 may now be rotated until the stop flange 47 on the stem hits the stop abutment 34 on passageways, for body to define a first position wherein the top of the slot 48 is aligned with one of the passageways, for example passageway 22, and the port 50 is aligned with another passageway, for example passageway 18, thereby providing fluid flow communication between the inlet passageway 18 and the outlet passageway 22 through the stem 14.

Figure 2:
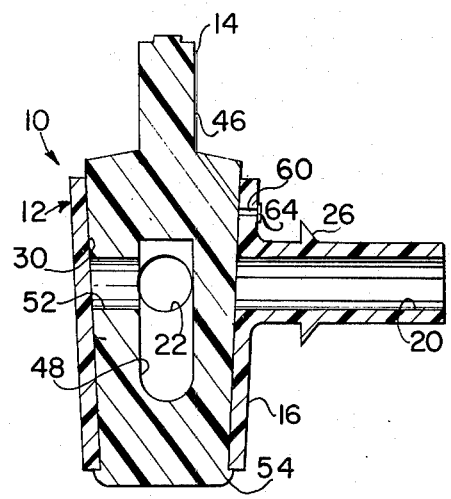
FIG. 2 is a sectional view taken along line 2—2 of FIG. 1.

With the stem in this position the port 52 is non-aligned with the passageway 20 and, therefore, the stem side wall 44 obturates the passageway 20 as can be seen in FIG. 2. Rotation of the stem 14 through 180° until the stop flange 47 again hits the abutment 34 effects alignment of the bottom of the slot 48 with the passageway 18 and alignment of the port 52 with the passageway 20 while the passageway 22 is obturated by the stem side wall 44 thereby providing fluid flow communication between the inlet passageway 18 and the outlet passageway 20 through the stem 14. Rotation of the stem 14 into an intermediary position, such as by rotating the stem 90°, causes the stem side wall 44 to obturate the passageways, 20, 22 thereby preventing fluid flow through the stopcock 10.

It has been found that if the diameter of the passageways 18, 20, 22 is small, such as around ¼ inch, upon cessation of flow through the stopcock, liquid will remain in the passageways because of surface tension. Dabbing the passageway with an absorbent material like cotton or tapping the stopcock will not remove all of the liquid from the passageway. With certain applications, particularly medical uses, it is very desirable to remove all liquid from the passageways when the stopcock is closed.

In accordance with this invention a small vent is provided to communicate with the passageway. As here embodied, a vent 60 is provided through the body wall 16. The vent 60 preferably is formed parallel to the passageway 20 so that the pin or core used for forming the vent is removed by straight pull in the same direction as the core used for forming the passageway 20 to reduce manufacturing complexity and cost. A depression 62 is formed in the stem 44 to interconnect the vent 60 and the passageway 20 when the stem 14 is in its intermediary position where all three passageways are closed. The vent should have a very small diameter in order to avoid leakage therethrough. It has been found that for a passageway having a diameter of around 3/16 inch, a vent having a diameter of between 0.0025–0.0040 will serve the purpose without leakage. To further ensure avoidance of leakage, a conventional hydrophobic air filter 64 such as a microporous polypropylene or polyethylene film, can be placed across the vent 60, such as on the outer surface of the body or by means of a plug placed in the vent.

Use of the vent 60 permits the passageway 20 to be emptied clean of all liquid. If the liquid doesn't empty from the passageway of its own accord, it can be emptied by dabbing the outlet end of the passageway 20 with an absorbent material or by tapping the stopcock.

It can be seen that the stopcock of this invention is formed of only two elements, namely a body and a stem, both of which can be easily molded and which can be assembled together without the use of other locking elements into a multi-port stopcock wherein the ports may be separated both angularly about the circumference of the stopcock and axially along the length thereof. Furthermore, because of the length of the slot 48, the stem 14 may be used with several different bodies having different axial port positions and minimizes the need for close tolerances to ensure alignment of the passageways through the body and the ports through the stem.

What is claimed is:

1. A stopcock comprising:
   a. a body having a bore extending axially therethrough, first, second and third passageways extending transversely through said body and intersecting said bore, said second and third passageways being axially spaced from said first passageway, and each of said passageways being angularly spaced from said other passageways about the periphery of said bore;
   b. a stem mounted for rotation within said bore, said stem having a side wall, a first end wall, a second end wall spaced axially from said first end wall, a handle on one of said end walls, an axially elongated slot extending radially partially through said stem and intersecting said side wall, and first and second ports, each of said ports being angularly spaced from the intersection of said slot and said side wall about the periphery of the stem, said first and second ports also being angularly and axially spaced apart, and said ports intersecting said slot at the interior of said stem, the axial length of said slot being greater than the axial spacing between said first and said second and third passageways;
   said stem being rotatable between a first position wherein said first and second passageways are in fluid flow communication through said slot and said first port and wherein said third passageway is obturated and a second position therein said first and third passageways are in fluid flow communication through said slot and said second port and wherein said second passageway is obturated; and said stem also being rotatable into a third position wherein said first passageway is obturated, said third position lying angularly between said first and said second positions.

2. A stopcock as defined in claim 1 wherein said stem is tapered from said first end wall toward said second end wall and includes a radial projection adjacent to said second end wall, said projection having a shape and size enabling said stem to be inserted through the bore of said body on assembly and providing an abutment preventing said stem from being removed from said body.

3. A stopcock as defined in claim 1 including a vent through said body and communicating with at least one of said passageways, said vent being sufficiently small to effect air flow communication between said one of said passageways and the atmosphere while precluding flow of liquid through said vent.

4. A stopcock as defined in claim 2 wherein said projection is a bead having a radially directed shoulder spaced from said second end wall and a base tapered from said shoulder toward said second end wall, said tapered base facilitating insertion of said stem through said body and said shoulder restraining removal of said stem from said body.

5. A disposable stopcock comprising:
   a. a plastic molded body having a tapered bore extending axially therethrough, an inlet passageway and first and second outlet passageways extending transversely through said body and intersecting said bore, each of said passageways being angularly spaced from said other passageways about the periphery of said bore, and said inlet and at least one of said outlet passageways being axially spaced apart;
   b. a plastic molded stem mounted for rotation within said bore, said stem having a side wall, a first end wall, a second end wall spaced axially from said first end wall, a handle on said first end wall, an axially elongated slot extending radially partially through said stem and intersecting said side wall, and first and second ports angularly spaced from the intersection of said slot and said side wall about the periphery of the stem, said first and second ports being angularly spaced apart and intersecting said slot at the interior of said stem, the axial length of said slot being greater than the axial spacing between said inlet and said at least one of said outlet passageways;
   said stem being tapered from said first end wall toward said second end wall and having a radially projecting bead adjacent to said second end wall, said bead having a shoulder spaced from said second end wall and a base tapered toward said second end wall, said bead having a shape and size facilitating insertion of said stem through said body and said shoulder abutting the exterior surface of said body to restrain removal of said stem from said body;
   said stem being rotatable between a first position wherein said inlet and said first outlet passageways are in fluid flow communication through said slot and said first port and wherein said second outlet passageway is obturated and a second position wherein said inlet and said second outlet passageways are in fluid flow communication through said slot and said second port and wherein said first outlet passageway is obturated; and said stem also being rotatable to a third position wherein said inlet passageway is obturated, said third position lying angularly between said first and said second positions.

6. A stopcock as defined in claim 5 including stop means for preventing rotation of said stem in one direction when said stem is in said first position and for preventing rotation of said stem in another direction when said stem is in said second position.

7. A disposable stopcock comprising:
   a. a plastic molded body having a bore extending axially therethrough, first, second and third passageways extending transversely through said body and intersecting said bore, said passageways being angularly spaced apart about the periphery of said bore, at least two of said passageways being axially spaced apart, a vent through said body and communicating with at least one of said passageways adjacent to said bore to effect air flow communication between said one of said passageways and the atmosphere, and a hydrophobic air filter across said vent;

b. a plastic molded stem mounted for rotation within said bore, said stem having a side wall, a first end wall, a second end wall spaced axially from said first end wall, a handle integrally formed on one of said end walls, an axially elongated slot extending radially partially through said stem and intersecting said side wall, first and second ports angularly spaced from the intersection of said slot and said side wall about the periphery of the stem and intersecting said slot at the interior of said stem; said first and second ports being angularly and axially spaced apart, the axial length of said slot being greater than the axial spacing between the axially spaced passageways;

said stem being rotatable between a first position wherein said first and second passageways are in fluid flow communication through said slot and said first port, a second position wherein said first and third passageways are in fluid flow communication through said slot and said second port and a third position wherein there is not fluid flow communication between said first passageway and either of said second and third passageways.

8. A stopcock consisting of only two parts,
a. a plastic molded body having a tapered bore extending axially therethrough, first, second and third passageways extending transversely through said body and intersecting said bore, said passageways being angularly spaced apart about the periphery of said bore, and at least two of said passageways being axially spaced apart; and b. a plastic molded stem mounted for rotation within said bore, said stem having a side wall, a first end wall, a second end wall spaced axially from said first end wall, a handle integrally molded on one of said end walls, an elongated slot extending radially partially through said stem and intersecting said side wall, the axial length of said slot being greater than the axial spacing between the axially spaced passageways, first and second ports angularly spaced from the intersection of said slot and said side wall about the periphery of the stem and intersecting said slot in the interior of said stem; said first and second ports being angularly and axially spaced apart corresponding to the spacing of said passageways;

said stem being tapered from said first end wall toward said second end wall and having a radially projecting bead integrally molded thereon adjacent to said second end wall;

a radial projection extending from one of said stem and said body and abutting an exterior surface on one end of the other of said stem and said body to restrain removal of said stem from said body;

said stem being rotatable between a first position wherein said first and second passageways are in fluid flow communication through said slot and said first port, a second position wherein said first and third passageways are in fluid flow communication through said slot and said second port and a third position wherein at least two of said passageways are obturated; and said stem and said body having cooperating stop means for preventing rotation of said stem in one direction when said stem is in one of said positions and for preventing rotation of said stem in another direction when said stem is in another of said positions.

9. A stopcock comprising:
a. a plastic molded body having a bore extending axially therethrough, first, second and third passageways extending transversely through said body and intersecting said bore, said passageways being angularly spaced apart and at least two of said passageways being axially spaced apart, a vent through said body and communicating with at least one of said passageways adjacent to said bore to effect air flow communication between said one of said passageways and the atmosphere;

b. a plastic molded stem mounted for rotation within said bore, said stem having a side wall, first end wall, a second end wall spaced axially from said first end wall, a handle integrally formed on one of said end walls, an axially elongated slot extending radially partially through said side wall, first and second ports angularly spaced from the intersection of said slot and said side wall about the periphery of the stem and intersecting said slot at the interior of said stem; said first and second ports being angularly and axially spaced apart, the axial length of said slot being greater than the axial spacing between the axially spaced passageways;

said stem being rotatable between a first position wherein said first and second passageways are in fluid flow communication through said slot and said first port, a second position wherein said first and third passageways are in fluid flow communication through said slot and said second port and a third position wherein there is no fluid flow communication between said first passageway and either of said second and third passageways.

10. A disposable stopcock comprising:
a. a body having a bore extending axially therethrough, inlet and outlet passageways extending transversely through said body and intersecting said bore, said passageways being axially spaced, and said passageways also being angularly spaced apart about the periphery of said bore, and said body also having a vent extending through said body and communicating with at least one of said passageways, said vent being sufficiently small to effect air flow communication between said one of said passageways and the atmosphere while precluding flow of liquid through said vent;

b. a stem mounted for rotation within said bore, said stem having a side wall, a first end wall, a second end wall spaced axially from said first end wall, a handle on one of said end walls, an axially elongated slot extending radially partially through said stem and intersecting said side wall and a port angularly spaced from the intersection of said slot and said side wall about the periphery of the stem and intersecting said slot at the interior of said stem, the axial length of said slot being greater than the axial spacing between said inlet and outlet passageways;

said stem being rotatable between a first position wherein said inlet and said outlet passageways are in fluid flow communication through said slot and said port and a second position wherein at least one of said inlet and outlet passageways is obturated.

* * * * *